(12) United States Patent
Urra et al.

(10) Patent No.: US 9,333,459 B2
(45) Date of Patent: May 10, 2016

(54) AIR DRYING DEVICE FOR A RAIL VEHICLE

(71) Applicant: KNORR-BREMSE SYSTEME FÜR SCHIENENFAHRZEUGE GMBH, Munich (DE)

(72) Inventors: Christian Urra, Munich (DE); Angelika Riedi, Munich (DE); Peter Lorra, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/389,772

(22) PCT Filed: Apr. 4, 2013

(86) PCT No.: PCT/EP2013/057129
§ 371 (c)(1),
(2) Date: Oct. 1, 2014

(87) PCT Pub. No.: WO2013/150110
PCT Pub. Date: Oct. 10, 2013

(65) Prior Publication Data
US 2015/0075381 A1    Mar. 19, 2015

(30) Foreign Application Priority Data

Apr. 5, 2012    (DE) .......................... 10 2012 007 028

(51) Int. Cl.
*B01D 53/02*    (2006.01)
*B01D 53/26*    (2006.01)
(Continued)

(52) U.S. Cl.
CPC ............. *B01D 53/261* (2013.01); *B60T 17/004* (2013.01); *F15B 21/048* (2013.01); *B01D 53/0415* (2013.01); *B01D 2259/4566* (2013.01)

(58) Field of Classification Search
CPC .................. B01D 2259/4566; B01D 53/0415; B01D 53/261; B60T 13/26; B60T 17/004; F15B 21/04; F15B 21/048
See application file for complete search history.

(56) References Cited

U.S. PATENT DOCUMENTS 4,007,021 A * 2/1977 Gyllinder .............. B60T 17/004
                                                            95/123
2012/0031273 A1   2/2012 Heer

FOREIGN PATENT DOCUMENTS

CN    1313816 A    9/2001
CN    1662409 A    8/2005
(Continued)

OTHER PUBLICATIONS

Search Report for International Patent Application No. PCT/EP2013/057129; Dec. 17, 2013.

(Continued)

*Primary Examiner* — Christopher P Jones
(74) *Attorney, Agent, or Firm* — Barnes & Thornburg LLP

(57) ABSTRACT

An air drying device for a rail vehicle, with a first air dryer container, a second air dryer container, and an air supply through which air to be dried can be supplied by a compressor to the air drying device. The air drying device also has an air outlet which is or can be connected to a storage area, wherein the air drying device includes a regeneration line by which air from the storage area can be conducted to the air supply, bypassing the first air dryer container and/or the second air dryer container and/or the air outlet. Also disclosed is a compressed air supply system for a rail vehicle with such an air drying device and a corresponding rail vehicle.

10 Claims, 2 Drawing Sheets

(51) Int. Cl.
*B60T 17/00* (2006.01)
*F15B 21/04* (2006.01)
*B01D 53/04* (2006.01)

(56) References Cited

FOREIGN PATENT DOCUMENTS

| | | |
|---|---|---|
| DE | 3244414 A1 | 6/1984 |
| DE | 60030430 T2 | 12/2006 |
| DE | 102010031306 A1 | 1/2012 |
| EP | 0933118 A1 | 8/1999 |
| WO | 0069696 A1 | 11/2000 |

OTHER PUBLICATIONS

English Translation of Notification Concerning Transmittal of International Preliminary Report on Patentability and Written Opinion of the International Search Authority for International Patent Application No. PCT/EP2013/057129, dated Apr. 4, 2013.

Chinese Office Action for Application No. 201380026297.2, dated Feb. 3, 2016.

\* cited by examiner

AIR DRYING DEVICE FOR A RAIL VEHICLE

PRIORITY CLAIM

This patent application is a U.S. National Phase of International Patent Application No. PCT/EP2013/057129, filed 4 Apr. 2013, which claims priority to German Patent Application No. 10 2012 007 028.4, filed 5 Apr. 2012, the disclosures of which are incorporated herein by reference in their entirety.

FIELD

Disclosed embodiments relate to an air drying device for a rail vehicle, to a compressed air supply system for a rail vehicle, and to a corresponding rail vehicle.

SUMMARY

In rail vehicles, pneumatic brakes and other pneumatically driven devices are frequently used. For this reason rail vehicles have a high consumption of compressed air and have compressed air supply devices to provide compressed air. Air drying devices are provided for such compressed air supply systems to remove water from the air before it is supplied to the consumer systems. However, desiccant used for this purpose generally retains water removed from the air and thereby loses efficiency. Dry air is, therefore, occasionally blown through desiccant to remove water absorbed therein. This process is generally referred to as regeneration.

Disclosed embodiments improve the efficiency and the regeneration of an air drying device of a rail vehicle.

BRIEF DESCRIPTION OF THE FIGURES

The invention will now be explained in an exemplary manner with reference to the appended drawings and to disclosed embodiments. In the drawings.

DETAILED DESCRIPTION OF THE DISCLOSED EMBODIMENTS

Figure 1:
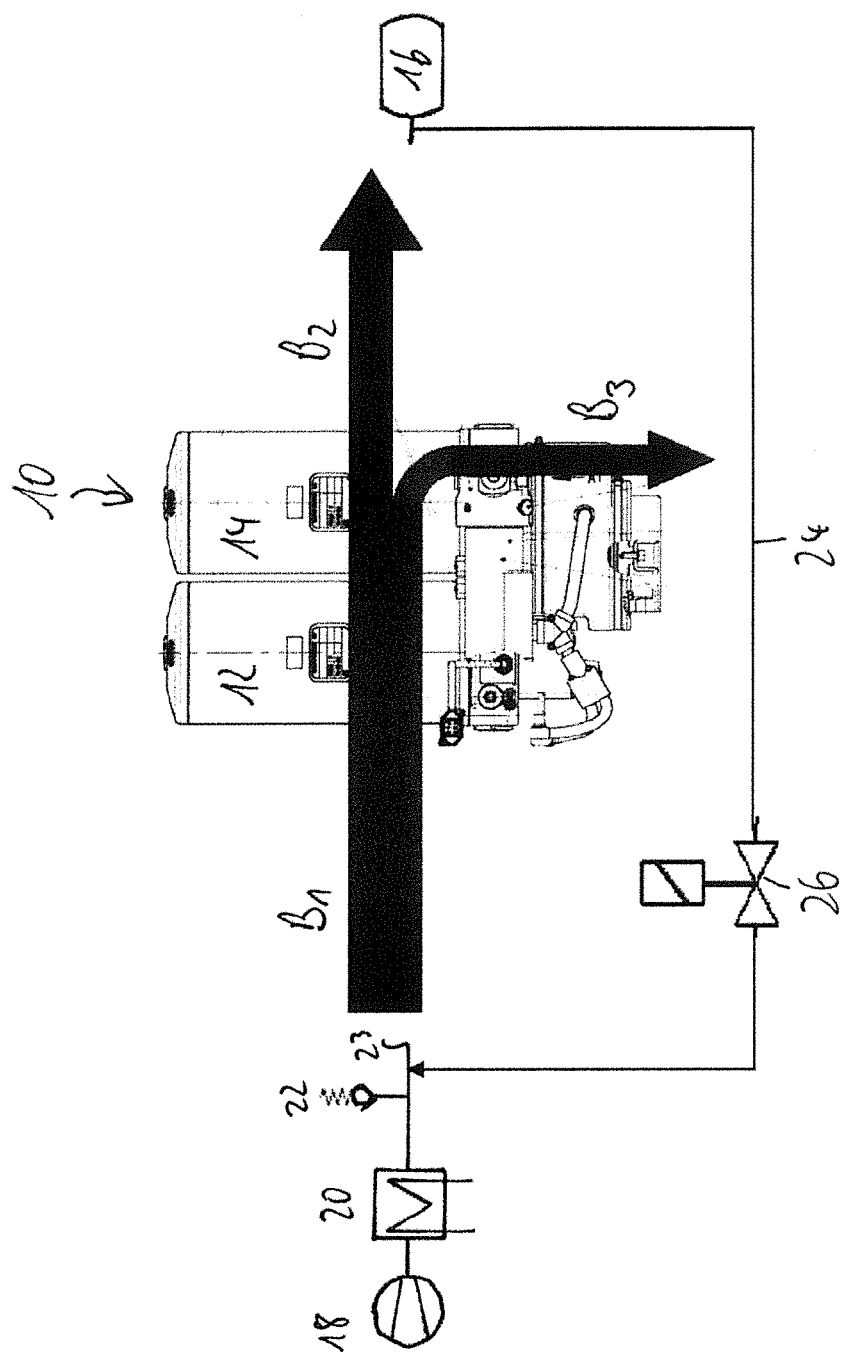
FIG. 1 shows schematically an air drying device for a rail vehicle in a delivery operating mode in which a compressor is delivering air.

In the disclosed embodiments, a rail vehicle may comprise one or more cars, one or more traction vehicles and/or railcars. It is possible that a rail vehicle has one or more pneumatically driven consumers, such as a pneumatic brake device. A rail vehicle may have a compressed air supply system which may include an air drying device. A compressed air supply system may comprise one or more compressors and further components, for example valve devices and/or filter devices and/or oil separators. An air drying device may generally comprise a first air dryer container and a second air dryer container. The air dryer containers may be configured separately from one another. In particular, it may be provided that the air dryer containers can be supplied with compressed air, and/or vented, separately from one another. For this purpose one or more suitable valves may be provided. In particular, the first air dryer container and the second air dryer container may be able to be supplied with compressed air and/or vented separately for regeneration. For this purpose, an air dryer container may, on the one hand, be able to be vented via a valve venting to the atmosphere. On the other hand, the air dryer container may be able to be supplied with compressed air, for example via an open inlet valve. The compressed air for a regeneration may be dry air. The valves may be controllable. An air dryer container may have a desiccant which may be arranged inside the container. It is possible that an air drying device has an air supply. An air supply may include an air inlet and/or an air conduit. The air supply may be connected or connectable to a compressor. Compressed air may be able to be supplied to the air drying device via the air supply. It may be provided that the air drying device is configured to conduct air flowing in via the air supply to one of the air dryer containers, so that the inflowing air can flow through the air dryer container. A desiccant may comprise, for example, a water-absorbing granulate, for example zeolite, and/or particles suitable for condensing water, which particles may contain, for example aluminum. It may be provided that, to supply consumers and/or storage containers with compressed air in a delivery operating mode, air delivered by a compressor is and/or can be supplied to the air drying device. In this case, a state in which a compressor delivers compressed air to an air supply of the air drying device can in general be regarded as a delivery operating mode. An operating mode in which a compressor does not deliver compressed air to the air drying device may be regarded as a non-delivery operating mode. Such a state can occur, for example, if a compressor is switched off and/or is switched to an idling mode, for example because all the desired pressure levels have been reached in pneumatic devices to be supplied. A non-delivery operating mode may refer, in particular, to a state in which the rail vehicle is stationary. In particular, an air drying device may be configured to conduct air to be dried through an air dryer container in a delivery operating mode. The air dryer container through which air to be dried is conducted may be referred to as the active air dryer container. In the active container the air can interact with the desiccant and, in particular, release water and moisture to the desiccant, so that the air can be dried. The air drying device may be configured not to conduct air to the atmosphere via a vent valve of the active container. The air drying device may be configured to conduct dried air from an active container to an air outlet. In this case the desiccant may retain water or moisture. In general, an air outlet may have one or more conduits and/or one or more compressed air connections. An air outlet may be configured to conduct compressed air from the first air dryer container and/or the second air dryer container, in particular from an active container, to a storage area. The air outlet may, for example, be connected or connectable via a compressed air connection to a storage area. An air outlet may be arranged in such a way that, with regard to a fluidic connection or an air flow, the first air dryer container and/or the second air dryer container is/are arranged and/or can be switched between the air outlet and the air supply. With regard to a fluidic connection or an air flow, the air outlet may be arranged and/or may be switchable between the first air dryer container and/or the second air dryer container and a storage area. The container through which air to be dried does not flow may be referred to as the inactive container. It is possible that the inactive container is not operative for providing dry compressed air via the air outlet. The inactive air dryer container may, however, be able to be operated in a regeneration mode. In a regeneration mode an air dryer container may in general be vented to the atmosphere, so that inflowing compressed air can remove and transport to the atmosphere water and moisture from the desiccant of the container. In particular, an air dryer container may be switchable to the regeneration state by switching a valve provided to vent the container to its vent position. The desiccant is therefore dried in the regeneration state. The drier the air used for regeneration, the more efficient the regeneration generally is. It may be provided that, in a delivery operating mode, a partial flow of dried air can be conducted from the active air dryer container to the inactive air dryer container, which may be operated in a regeneration state. A portion of the dry air may therefore serve to regenerate the air dryer container not being used to dry air. Accordingly, in a delivery operating mode one container at a time may be used to dry air while the other container is regenerated. The air drying device may be configured to switch the air dryer containers respectively between active and inactive in the delivery operating mode, so that their functions can be exchanged. A completely regenerated container can therefore be switched to active while a hitherto active container is switched to inactive and/or to its regeneration state for regeneration. The air outlet of the air drying device may in general be connected or connectable to a storage area, and/or may be provided in general to supply further components or devices with dry air. In this case a storage area may be regarded as an area and/or a collection of pneumatic devices which are able to receive and/or store dried air and/or air provided via the air drying device. In particular, a storage area may comprise one or more storage containers for storing compressed air. It is possible that the storage area is connected or connectable to consumers and/or storage containers. A storage container for storing compressed air for a regeneration may be regarded as a storage area or as a part of a storage area. In general, a process in which air is blown through desiccant to remove water retained therein may be referred to as regeneration. A connection between two pneumatic components which permits an air flow between the components may be regarded as a fluidic connection. A controllable valve may be an electrically or pneumatically controllable valve. In particular, a controllable valve may be a solenoid valve or may have a solenoid valve for pilot control. An air drying device may have an electronic control device and/or may be connected or connectable to such a device. It may be provided that the air drying device and/or valves and/or electro-pneumatic components of the air drying device are controllable by the control device. It may be provided that valves and/or the air drying device is/are controllable and/or switchable by the control device.

Disclosed embodiments relate to an air drying device for a rail vehicle, comprising a first air dryer container, a second air dryer container and an air supply by which or via which air to be dried can be supplied to the air drying device by a compressor. The air drying device further comprises an air outlet which is connected or connectable to a storage area. It is further provided that the air drying device includes a regeneration line via which air from the storage area can be conducted to the air supply while bypassing the first air dryer container and/or the second air dryer container and/or the air outlet. A regeneration can therefore also take place via the regeneration line, for example in a non-delivery operating state of a compressor, whereby the overall efficiency of the air drying device is increased. In general, it may be provided that the air drying device is configured to supply compressed air flowing in via the air supply to the first air dryer container and/or to the second air dryer container. In particular, the air drying device may be configured to supply air flowing in via the air supply selectively and/or alternately to the first air dryer container and/or to the second air dryer container. A regeneration operating mode which may be a non-delivery operating mode may be provided. The air drying device may be configured to cause dry air from the storage area to flow via the regeneration line in the regeneration operating mode. Dry air from the storage area can therefore flow to the air supply. The air drying device may be configured, in the regeneration operating mode, to switch the first air dryer container and/or the second air dryer container to a regeneration state allocated thereto, and in particular to vent the first air dryer container and/or the second air dryer container. It may be provided that, in the regeneration operating mode, the air drying device is configured to switch only the first air dryer container or the second air dryer container at a time to the allocated regeneration state. It is possible that the air drying device is able to switch the air dryer container which is not currently switched to the regeneration state to be connected, as the active air dryer container, upstream of the air dryer container which is switched to the regeneration state. The air from the storage area supplied to the air dryer container which is switched to the regeneration state can therefore be dried once again to carry out the regeneration still more efficiently. Alternatively, it is possible that the air drying device is able to shut off the air dryer container which is not switched to the regeneration state from the air supply, so that the air from the storage area can flow only through the air dryer container which is switched to the regeneration state. Alternatively or additionally, the air drying device may be configured, in the regeneration operating mode, to prevent a flow of air from the first air dryer container and/or the second air dryer container to the air outlet and/or to the storage area, for example by switching a corresponding valve to a shut-off position. It may be provided that, in the regeneration operating mode, the air dryer containers are switched successively to the regeneration state, so that the two containers can be regenerated successively. In this case, the respective other container may be connected upstream, or shut off from the air flow. However, it may be advantageous that only one of the air dryer containers is regenerated in the regeneration operating mode and, after the regeneration of the one container is ended, the regeneration operating mode is also ended. At least one regenerated air dryer container can therefore be available after the regeneration operating mode is ended. The regeneration operating mode of the air drying device may, in particular, be an operating mode in which a compressor is not delivering and/or the rail vehicle is stationary. The regeneration operating mode may be controllable on the basis of suitable signals. Such signals may represent, for example, the stationary state of the rail vehicle and/or the non-delivery state of the compressor. It is possible that an electronic control device is configured to switch the air drying device to the regeneration operating state on the basis of such signals.

A controllable valve which is able to shut off the regeneration line may be provided in the regeneration line. It may be provided that a fluidic connection via the regeneration line can be established via the controllable valve in an open position. A regeneration with air from the storage area can therefore be activated in a simple manner. In particular, it may be provided that the air drying device is configured to open the controllable valve in a regeneration operating mode.

The controllable valve may be a solenoid valve. This permits especially easy activation for a regeneration.

It is possible that the controllable valve is a 2/2-way valve. A valve of this type is very well suited to reliably shutting off or establishing a fluidic connection.

The storage area may include a storage container from which the regeneration line can be fed. The storage container may be provided specifically for making available compressed air for a regeneration operating mode. In particular, such a storage container can increase safety in a regeneration operating mode when the rail vehicle is travelling, since load is not then placed on other consumers. In particular, it may be provided that further pneumatic devices or containers which are located downstream of the storage container in a delivery operating mode can be shut off fluidically from the storage container in a regeneration operating mode, so that the compressed air for the regeneration is drawn only from the storage container. Other consumers are therefore not placed under load. Alternatively or additionally, it may be provided that the regeneration line can also be fed by other components from the storage area, especially in the regeneration operating mode.

In particular, the storage container may be connectable fluidically to the regeneration line via a controllable storage valve. A controlled supply with compressed air is therefore possible during the regeneration operating mode. The storage valve may be configured, for example, to shut off a fluidic connection between the regeneration line and components located downstream of the storage container.

In at least one disclosed embodiment, the air drying device may be controllable by an electronic control device. The control device may be configured as a part of the air drying device or separately therefrom. In particular, the control device may be configured to switch valves of the air drying device and/or to activate the compressor.

The air drying device may be set up to carry out a regeneration of the first air dryer container and/or of the second air dryer container via the regeneration line in an operating state in which air is not supplied via a compressor. A regeneration can therefore be activated, for example via a control device, in a non-delivery operating state. It is possible that an air dryer container can be switched to its regeneration state for regeneration thereof. The air drying device may be configured, to regenerate one air dryer container, to switch the other air dryer container to be connected upstream thereof. In this case the upstream air dryer container may be switched to active and therefore is not in the regeneration state.

In addition, disclosed embodiments relate to a compressed air supply system for a rail vehicle having an air drying device as described herein. The compressed air supply system may comprise at least one compressor and/or a cooler and/or a safety valve arrangement and/or an electronic control device and/or protection valve arrangements. The cooler and/or the safety valve arrangement and/or the protection valve arrangements may be associated with the air drying device.

A rail vehicle having a compressed air supply system as described herein and/or an air drying device as described herein is further provided.

FIG. 1 shows an air drying device 10 of a rail vehicle. The air drying device 10 comprises a first air dryer container 12 and a second air dryer container 14. Connected to the air drying device 10 via an air outlet is a storage area 16 which may include one or more storage containers and/or one or more consumers. Also connected to the air drying device 10 is a compressor 18 which may be connected or connectable via an optionally present cooler 20 to an air supply 23 of the air drying device 10. A safety valve 22 by means of which a safety pressure can be set may further be provided. In this example the safety valve 22 is provided in the air supply 23 of the air drying device 10; it may, however, also be arranged at a suitable different location. If a pressure which exceeds a set safety pressure is reached in the system, the safety valve 22 opens to the atmosphere and thereby ensures that the safety pressure is not exceeded. A regeneration line 24 which is able to establish a fluid-conducting connection from the storage area 16 to the air supply 23 is further provided. A controllable valve 26 is incorporated in the line 24. The valve 26 may be regarded as a regeneration valve. It is possible that the valve 26 is a 2/2-way valve which can open or shut off a fluid-conducting connection through the line 24. The valve 26 may be controllable by an electronic control device, for example a control device of the air drying device 10 and/or a vehicle control device. In normal operation of the rail vehicle the compressor 18 delivers compressed air through the cooler 20 to the air supply 23 of the air drying device 10. A delivery operating state is therefore present. In this case the air drying device 10 is switched in such a way that compressed air from the compressor 18 to be dried flows through a respective one of the air dryer containers 12 and 14 to be dried. This air dryer container, container 12 in FIG. 1, acts as the active air dryer container for drying air. The air flow to be dried is denoted by B1 in the figure. The dried air flow emerging from the active container 12 is subdivided by an air guidance device into two partial flows B2 and B3. The partial flow B2, which is larger than the partial flow B3, is conducted to the storage area 16 via an air outlet. The partial flow B3 is conducted through the inactive air dryer container 14 which is switched to its regeneration state. A regeneration of the inactive container 14 thereby takes place while dry air flows into the storage area via the container 12 and the air outlet. The partial flow B3 humidified by the regeneration of the inactive container is discharged outwards into the atmosphere via a suitable valve device. During operation of the compressor the roles of the air dryer containers 12, 14 are regularly exchanged, so that the containers are switched alternately to active and to the regeneration state. In this way air B1 from the compressor 18 to be dried can be conducted into the second air dryer container 14. After it has been dried in the air dryer container 14, a corresponding partial flow B2 can flow into the storage area 16. However, a partial flow B3 is conducted through the first air dryer container 12 to regenerate same. The alternation between the roles of the air dryer containers may be controlled by an electronic control device. Suitable valve devices and lines may be provided to make possible the mode of operation described. The alternation of the roles of the air dryer containers 12, 14 may take place at regular time intervals and/or on the basis of sensor signals. In particular, sensors for determining the humidity of one or more of the partial flows B1, B2 or B3 may be provided. On the basis of the humidity measurements it may be determined, for example, whether the active air dryer container is close to saturation of the desiccant and therefore is unable to dry the supplied air efficiently. An exchange to the other air dryer container may then be effected. Alternatively or additionally, the air drying device 10 may be configured to carry out an exchange after the inactive container has been completely regenerated.

Figure 2:
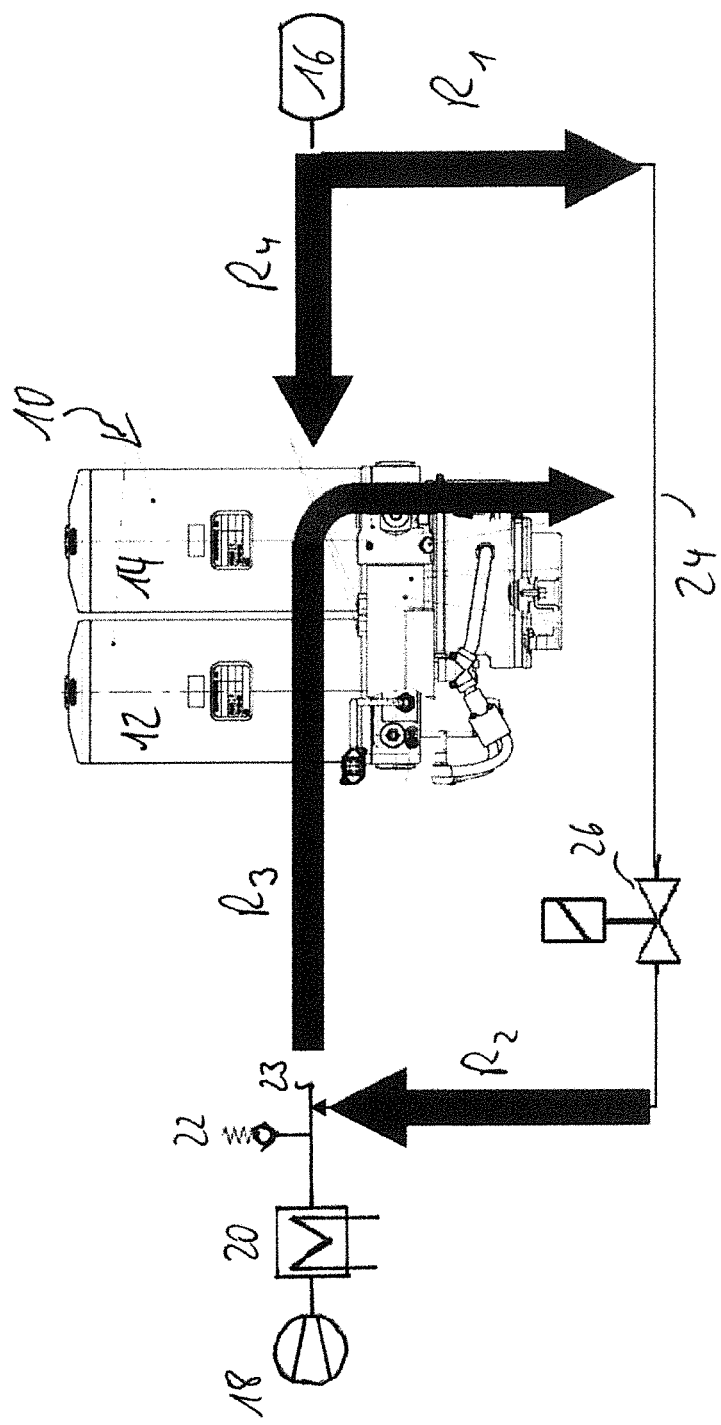
FIG. 2 shows schematically the air drying device for a rail vehicle in a regeneration operating state in which the compressor is not delivering air.

FIG. 2 shows an air drying device 10 as illustrated in FIG. 1 in a regeneration operating mode. In this state compressed air is not supplied to the air drying device 10 via the compressor 18. Such a state can occur, for example, when the compressor is switched off or is operated in an idling switching state in which it delivers to the atmosphere. This usually happens when the pressure in the storage area 16 has reached a desired level. The air drying device 10 may be configured to activate the regeneration operating mode especially if the rail vehicle is stationary and is using little or no compressed air. In the regeneration operating mode shown in FIG. 2 the regeneration valve 26 is switched to its open position. In this position compressed air can flow from the storage area 16, especially from a regeneration air container, through the line 24 into the air supply 23 of the air drying device 10. The air from the storage area 16 is dried air. This air can be supplied for the regeneration to at least one of the air dryer containers 12, 14 via the line 23. In the example shown in FIG. 2 it is provided that the regeneration air is first conducted through one of the air dryer containers, the air dryer container 12 in the example, to be dried therein. The already dry regeneration air is thereby dried further. This dried regeneration air is then supplied to the air dryer container 14 to regenerate same. In this case the efficiency of regeneration is especially high since the air used for regeneration is especially dry. In this example, therefore, in the regeneration operating mode the other container, as the active container, is switched to be connected upstream of a container to be regenerated. After the one dryer container 14 has been regenerated, the other dryer container 12 can be regenerated. In this case it may be provided that, during the regeneration of the second container, the regeneration air is not conducted through the already completely regenerated container to be pre-dried therein. In this way two regenerated air dryer containers 12, 14 can be ready when the compressor begins to deliver again and/or the vehicle is moved again. However, it is also possible that only one of the air dryer containers is regenerated in this regeneration operating mode, so that a completely regenerated air dryer container is in all cases ready upon resumption or starting of a journey. The partial flows produced in this operating mode are designated R1, R2, R3 and R4. The air flow R1 flows from the storage area 16 via the regeneration line 24 and through the valve 26 to flow into the air supply 23 as the partial flow R2. The air supply 23 may generally be secured against a flow in the direction of the compressor by means of a non-return valve, for example. The partial flow R2 flows via the air supply 23 as the flow R3 through the active container 12 to be dried therein, before passing through the container 14 which is switched to the regeneration state. In this example, a partial flow from the air drying device 10 to the storage area 16 via the air outlet is prevented, for example by a suitable valve arrangement which may comprise a corresponding non-return valve and/or a shut-off valve. A partial flow R4 may form in an air conduit between the air outlet of the air drying device 10 and the storage area 16, which partial flow R4 may be available at the air outlet. It may be provided that the air drying device 10 is able to allow a partial flow R4 to flow to the container 14 to be regenerated to reinforce the partial flow R3, for example via a non-return valve mentioned. Such a non-return valve may be connected in parallel to a shut-off valve via which compressed air is able to flow to the storage area 16 in a delivery operating mode. It can be seen that air from the storage area 16 can be conducted and/or is conducted via the regeneration line 24 to the air supply 23 while bypassing the air outlet and the air dryer containers 12, 14.

The features disclosed in the preceding description, in the drawings and in the claims can be essential to the realization of the invention both singly and in any combination.

LIST OF REFERENCES

10 Air drying device
12 Air dryer container
14 Air dryer container
16 Storage area
18 Compressor
20 Cooler
22 Safety valve
23 Air supply
24 Regeneration line
26 Valve

The invention claimed is:

1. An air drying device for a rail vehicle, comprising:
   a first air dryer container;
   a second air dryer container;
   an air supply through which air from a compressor can be conducted to the air drying device; and
   an air outlet which is connected or connectable to a storage area;
   wherein the air drying device includes a regeneration line via which air from the storage area is conducted into the air supply while bypassing the air outlet.

2. The air drying device of claim 1, wherein a controllable valve which is able to shut off the regeneration line is provided in the regeneration line.

3. The air drying device of claim 2, wherein the controllable valve is a solenoid valve.

4. The air drying device of claim 2, wherein the controllable valve is a 2/2-way valve.

5. The air drying device of claim 1, wherein the storage area includes a storage container from which the regeneration line is fed.

6. The air drying device of claim 5, wherein the storage container is connectable fluidically to the regeneration line by a controllable storage valve.

7. The air drying device of claim 1, wherein the air drying device is controllable by an electronic control device.

8. The air drying device of claim 1, wherein the air drying device is set up to carry out a regeneration of the first air dryer container and/or of the second air dryer container via the regeneration line in an operating state in which air is not supplied via a compressor.

9. A compressed air supply system for a rail vehicle having an air drying device comprising:
   a first air dryer container;
   a second air dryer container;
   an air supply through which air to be dried from a compressor can be conducted to the air drying device; and
   an air outlet which is connected or connectable to a storage area;
   wherein the air drying device includes a regeneration line via which air from the storage area can be conducted into the air supply while bypassing the air outlet.

10. A rail vehicle having a compressed air supply system of claim 9.

* * * * *